United States Patent [19]
Altherr et al.

[11] Patent Number: 5,879,016
[45] Date of Patent: Mar. 9, 1999

[54] PIVOTING SPRING-MOUNTED AXLE SUSPENSION

[75] Inventors: August Altherr, Kaiserslautern; Michael Teich, Mannehim; Herbert Gelb, Hockenheim, all of Germany

[73] Assignee: Deere & Company, Moline, Ill.

[21] Appl. No.: 895,382

[22] Filed: Jul. 16, 1997

[30] Foreign Application Priority Data

Oct. 19, 1996 [DE] Germany .................. 196 43 263.4

[51] Int. Cl.⁶ .................................................. B60G 9/02
[52] U.S. Cl. .......................... 280/124.112; 280/124.113
[58] Field of Search .................... 280/124.106, 124.112, 280/124.113, 124.114, 124.111

[56] References Cited

U.S. PATENT DOCUMENTS

| 1,574,864 | 3/1926 | Billins ............................. 280/124.114 |
| 3,554,576 | 1/1971 | Parker ............................. 280/124.113 |
| 5,271,632 | 12/1993 | Glaser et al. ................... 280/124.112 |
| 5,476,150 | 12/1995 | Hurlburt et al. ................ 280/124.113 |

FOREIGN PATENT DOCUMENTS

| 0 499 887 A | 8/1992 | European Pat. Off. . |
| 0 518 226 | 12/1992 | European Pat. Off. . |
| 0 603 394 A | 6/1994 | European Pat. Off. . |
| 38 34 693 | 6/1989 | Germany . |
| 39 01 757 | 8/1989 | Germany . |
| 41 29 715 A | 3/1993 | Germany . |
| 196 21 519 A | 12/1997 | Germany . |
| 818 992 A | 8/1959 | United Kingdom . |

Primary Examiner—Peter C. English

[57] ABSTRACT

An axle suspension suspends a rigid axle body from a frame of a vehicle. The suspension has a pivot bearing for pivotally supporting the axle body, a spring arrangement for resiliently coupling the axle body to the frame, a thrust arm extending in a longitudinal direction between the axle body and the frame, and a steering arm extending generally horizontally and transverse to the longitudinal axis of the vehicle. The steering arm has one end connected to the frame and a second end connected by the pivot bearing to the axle body. The axle body supports rotatable wheels. According to the present invention, the suspension includes a pivot stop between the axle body and the vehicle frame. The pivot stop is coupled to the axle at a first joint which is spaced apart from a pivot axis of the axle, and coupled to the frame at a second joint. The line connecting the two joints extends generally parallel to the main axis of the axle body. During pivoting of the axle body about the pivot axis, and during spring deflection, in which the distance between the axle body and the vehicle chassis varies, the joints move with respect to each other. The pivot stop primarily limits the axial distance between the two joints and thereby limits the pivoting angle range of the axle body. Preferably, a line connecting the two joints extends generally horizontally and transverse to the fore-and-aft axis of the vehicle.

14 Claims, 4 Drawing Sheets

PIVOTING SPRING-MOUNTED AXLE SUSPENSION

BACKGROUND OF THE INVENTION

The invention relates to a suspension for a rigid axle body which is pivotally supported and spring suspended with respect to the chassis or frame of an agricultural or industrial vehicle.

Agricultural and industrial vehicles, such as agricultural tractors, are frequently equipped with a rigid front axle body, which carries steerable wheels. To avoid loss of ground contact by the wheels when encountering uneven ground, the front axle body is supported in pivot bearings on the vehicle chassis. Depending on the vehicle design, which may be in unit body construction or contain a base frame that carries the vehicle components, the front axle body may be pivoted through one or more pivot pins aligned with each other from the front axle support, which is fastened to a vehicle component, or it may be pivoted from a part of the vehicle base frame. The pivot angle is limited so that the axle body and the wheels do not collide with other vehicle components during pivoting. At an excessive pivot angle, for example, the tires as well as the fenders could damage the chassis. The maximum allowable pivot angle depends upon the vehicle geometry and may, for example, amount to 11 degrees. It is therefore desirable to limit the pivot angle of the axle body.

It is also known to support the front axle by springs from the vehicle chassis, in order to improve the safety of operation and the driving comfort of a vehicle, especially at higher transport speeds. For example, EP-B-0 518 226 shows a front axle which is supported from the vehicle frame by a hydro-pneumatic spring arrangement with two hydraulic cylinders. Each of the hydraulic cylinders has one end coupled to a part of the front axle near the front wheels, and another end coupled to a frame component projecting to one side of the engine enclosure. Such an arrangement with hydraulic cylinders cantilevered far outboard limits visibility. If the hydraulic cylinders are relocated further inboard, the axle pivoting angle is limited.

SUMMARY OF THE INVENTION

Accordingly, an object of this invention is to provide a spring-mounted axle suspension supported in pivot bearings of the aforementioned type in such a way that the problems noted are overcome.

A further object of the invention is to provide such an axle suspension which limits the pivot angle without reducing the comfort of the spring mounting.

Another object of the invention is to provide such an axle suspension which is appropriate for confined spaces and which does not reduce visibility, and in which forces applied to the individual components are within acceptable limits.

These and other objects are achieved by the present invention, wherein an axle suspension suspends a rigid axle body from a frame of a vehicle. The suspension has a pivot bearing for pivotally supporting the axle body, a spring arrangement for resiliently coupling the axle body to the frame, a thrust arm extending in a longitudinal direction between the axle body and the frame, and a steering arm extending generally horizontally and transverse to the longitudinal axis of the vehicle. The steering arm has one end connected to the frame and a second end connected by the pivot bearing to the axle body. The axle body supports rotatable wheels. According to the present invention, the suspension includes a pivot stop between the axle body and the vehicle frame. The pivot stop is coupled to the axle at a first joint which is spaced apart from a pivot axis of the axle, and coupled to the frame at a second joint. The line connecting the two joints extends generally parallel to the main axis of the axle body. During pivoting of the axle body about the pivot axis, and during spring deflection, in which the distance between the axle body and the vehicle chassis varies, the joints move with respect to each other. The pivot stop primarily limits the axial distance between the two joints and thereby limits the pivoting angle range of the axle body. Preferably, a line connecting the two joints extends generally horizontally and transverse to the fore-and-aft axis of the vehicle.

DETAILED DESCRIPTION

Figure 1:
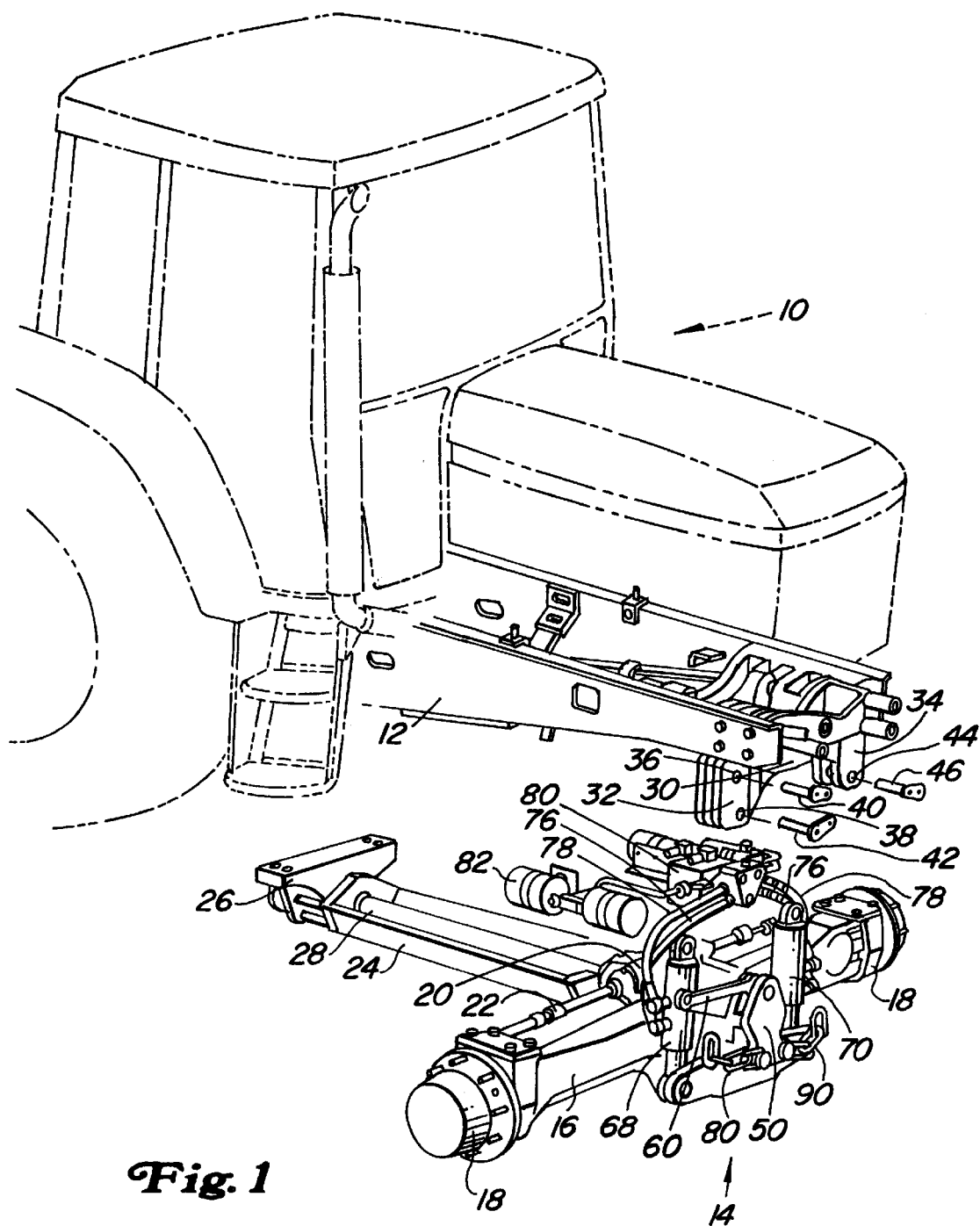
FIG. 1 is a perspective view of the present invention with components moved away from a tractor.

FIG. 1 shows the outline of an agricultural tractor 10 whose drive assemblies, such as engine, gearboxes and the like, not shown in any greater detail, are supported on a frame 12. The forward region of the frame is supported on a front axle 14 which includes a rigid axle body 16. At each of the outer ends of the axle body 16 a wheel flange 18 is located for carrying front wheels (not show) of the tractor. The wheel flanges 18 are supported in bearings on associated axle supports and can be steered in the usual manner by steering cylinders 20 and steering linkages 22. Preferably, the front axle 14 is a driven, steerable front axle.

The forward end of a thrust arm 24 is bolted to the rear side of the axle body 16. The rear end of the thrust arm 24 is connected in a joint to a seat 26, that can be fastened to the frame 12, through a ball joint (not shown). The ball joint permits pivoting of the thrust arm 24 together with the axle body 16 upward and downward as well as to the side. The thrust arm 24 has a generally upwardly opening U-shaped cross section that encloses a cavity. A conventional articulated shaft 28 extends through this cavity and drives the front wheels and the arm 24 covers and protects the articulated shaft 28 from below and at its sides. Since the thrust arm remains open upward, a small distance can be maintained between the thrust arm and an oil pan located above it. This is particularly advantageous for a spring-mounted axle suspension that is configured as a retrofit kit, since the vehicle chassis must be raised to an insignificant degree or not at all for the retrofit kit in comparison to its previous position. The thrust arm can be designed in various lengths so that a simple accommodation to differing gearboxes or vehicle wheelbases is possible.

A support 30 is fastened to the forward region of the frame 12. Support 30 includes two seat legs 32, 34 at the sides projecting downward. The seat leg 32, at the right as seen in the direction of travel, is provided with two joint bores 36, 38 located generally one above the other with associated locating pins 40, 42. The left seat leg 34, as seen in the direction of travel, is provided with a joint bore 44 with associated locating pin 46. At their forward ends each of the locating pins 40, 42, 46 carries a bracket with a bore at its side, which is used for a bolted connection of the locating pin 40, 42, 46 with the associated seat leg 32, 34 and thereby secures the locating pin 40, 42, 46 against rotation.

The center region of the axle body 16 carries a front support 50 that projects forward. The front support 50, the differential housing 48 of the front wheel drive which is located behind it and the axle body 16 may consist of a single casting. But, they may also be configured as individual components that can be bolted together.

Figure 2:
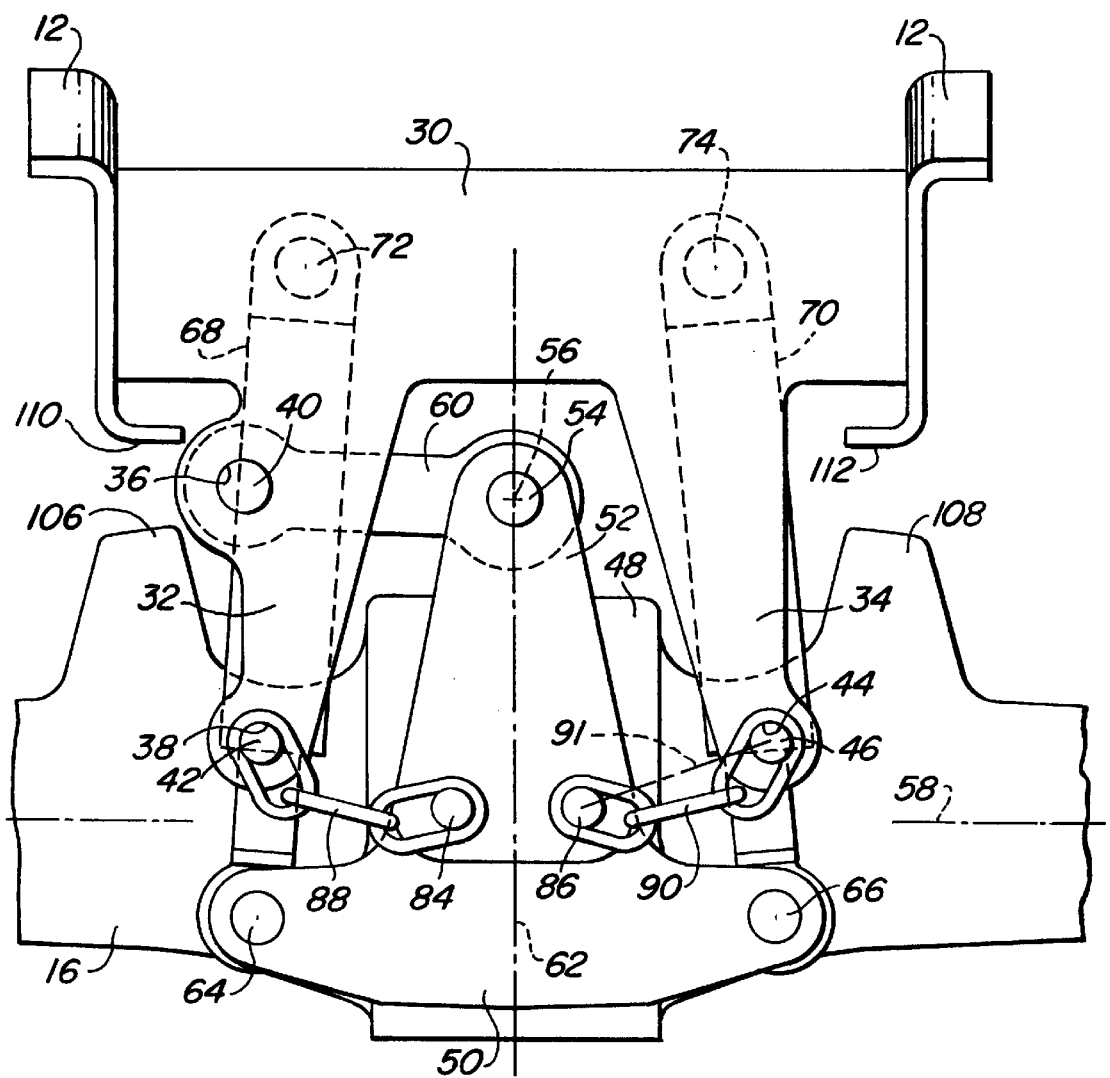
FIG. 2 is a simplified schematic front view of a portion of the suspension components of FIG. 1.

Referring now to FIG. 2, the front support 50 contains a central leg 52 projecting upward with a pivot bearing 54. The pivot axis 56 of the pivot bearing 54 extends centrally in the longitudinal direction of the vehicle and is located above the centerline 58 of the axle, which is congruent with the axis of rotation of the front wheels. A transverse steering arm 60, also called a Panhard rod, is connected in joints to the pivot bearing 54 on the one hand, and to the upper joint bore 36 of the right seat leg 32 on the other hand, and extends generally in horizontal direction and transverse to the longitudinal direction of the vehicle. The transverse steering arm 60 supports the axle body 16 towards the side and makes it possible for the axle body 16 to swing out or pivot about the pivot axis 56.

At its sides, the front support 50 contains two joints 64, 66 to each side of the center plane 62 of the axle and below the centerline 58 of the axle. At each of these joints 64, 66 the lower end of a hydraulic cylinder 68, 70 is connected, each of whose upper ends 72, 74 is connected in a joint to the support 30. The hydraulic cylinders 68, 70 extend generally in the vertical direction and support the vehicle chassis on the axle body 16. The hydraulic cylinders 68, 70 are double-acting and are connected in the usual manner with hydraulic lines 76, 78 to a control valve block 80 and pressure reservoir 82. These form a hydro-pneumatic spring and damping system. If the front axle is to be operated as an unsprung, pivoted axle, the two hydraulic cylinders 68, 70 are cross-connected to each other through the valve block 80, if necessary through an intervening throttling restriction, to damp the pivoting motion.

Two joints 84, 86 are fixed to the axle and are located alongside each other in the center region of the front support 50 at approximately the height of the centerline 58 of the axle and on either side of the center plane 62 of the axle. Each of these joints 84, 86 engages one end link 87 of a chain 88, 90. Each of the other end links of the chains 88, 90 engages one of the joints 38, 44 fixed to the chassis. The line 91 connecting each of the joints 38, 84 or 44, 86 of the chains 88, 90 extends at an acute or small angle with respect to the main axis of the axle body 16. This line 91 also extends generally transverse to a longitudinal direction of the vehicle and transverse to an axis of the cylinders 68, 70.

Figure 4:
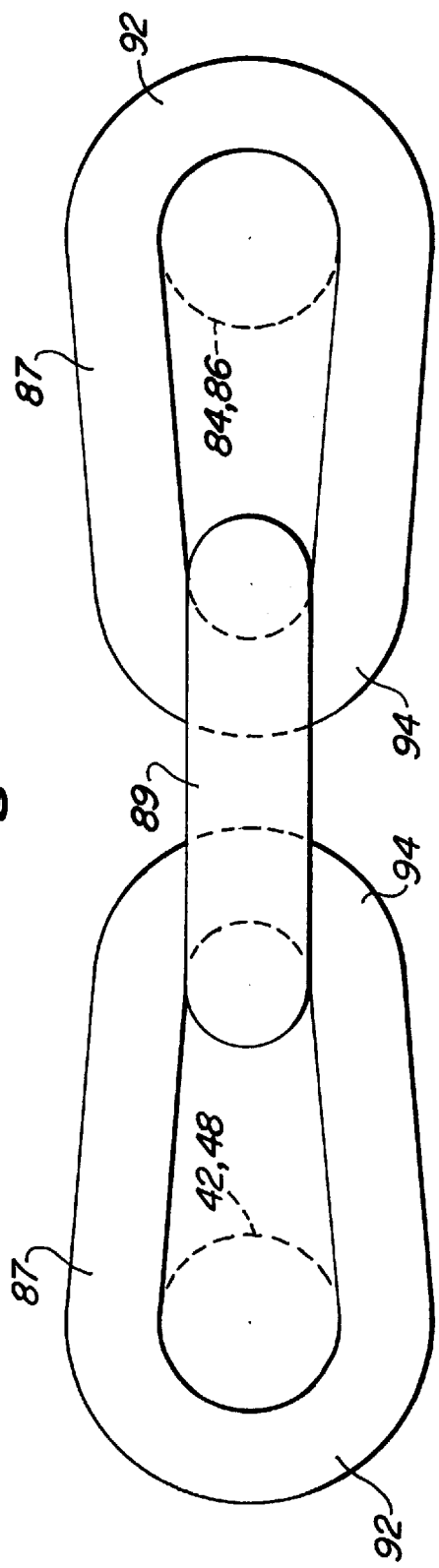
FIG. 4 is a partial sectional view of a chain pivot stop according to the present invention.

As shown in FIG. 4, each chain 88, 90 consists of the two end links 87 and a center connecting link 89. The end links 87 may be generally configured in a teardrop shape with a larger end 92 and a smaller end 94. The larger end 92 defines a larger opening which receives each of the pins 42, 46 of the joints 38, 44, 84, 86, while the smaller end 94 with the smaller opening receives the center connecting link 89.

Each of the chains 88, 90 acts as a first pivot stop. In the neutral position of the axle body 16 the chains are slack as is shown in FIG. 2. When a maximum allowable pivoting angle is reached one of the two chains 88, 90 is straightened and limits the pivoting motion of the axle body 16 as will be described in greater detail with reference to FIGS. 3a–3d.

Figure 5:
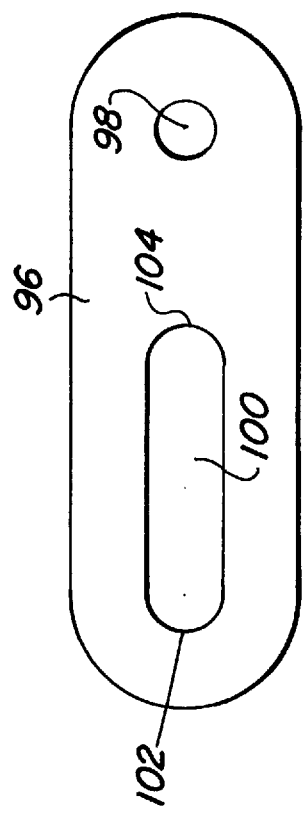
FIG. 5 shows an alternative pivot stop.

This operation of a chain 88, 90 can also be performed by a bracket (or rigid connecting element) 96 with a bore 98 and an elongated slot 100 according to FIG. 5. The bore 98 receives the pin 42, 46 of a joint 38, 44, 84, 86, while the pin of one of the other joints 38, 44, 84, 86 is guided in the slot 100 and can be shifted within the slot 100. Thus, the bracket 96 may be pivotally coupled to one joint and pivotally and slidably coupled to the other joint. The selection of the position and the length of the slot 100 permits the definition of the allowable pivoting angle. The slot 100 can be laid out in such a way that each of its end points 102, 104 form a stop to limit the pivoting angle in one of the two directions of pivoting.

The axle body 16 carries stop projections 106, 108 extending upward to each side of the center plane 62 of the axle. Above the stop projection 106, 108 and spaced at a distance from these, the frame 12 carries stop surfaces 110, 112. Stop projections 106, 108 and stop surfaces 110, 112 comprise a pair of second pivot stops which limit the relative motion between the axle body 16 and the vehicle chassis in the vertical direction. The second pivot stops configured in this way limit the pivoting angle of the axle body 16 at high spring deflections to an angle that is less than the usual allowable pivoting angle of, for example, 11 degrees. Thus, the second pivot stops limit relative motion between the axle body and vehicle chassis.

Figure 3A:
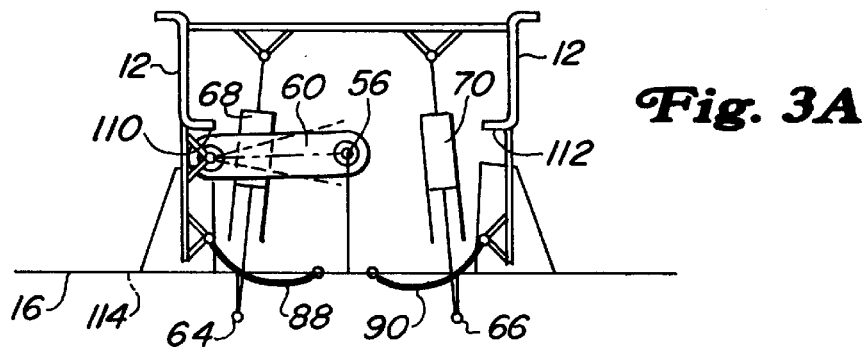
FIGS. 3a–3d show four schematic views of differing axle positions.
Figure 3B:
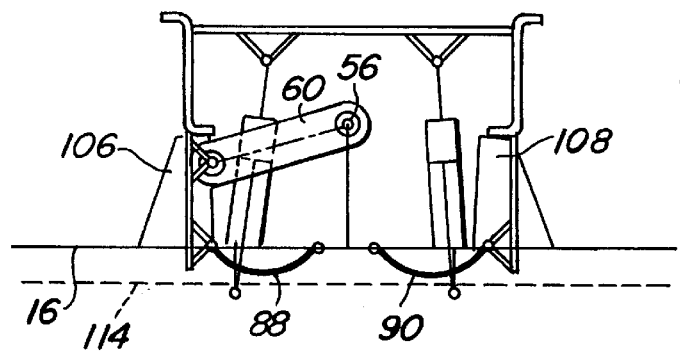
Figure 3C:
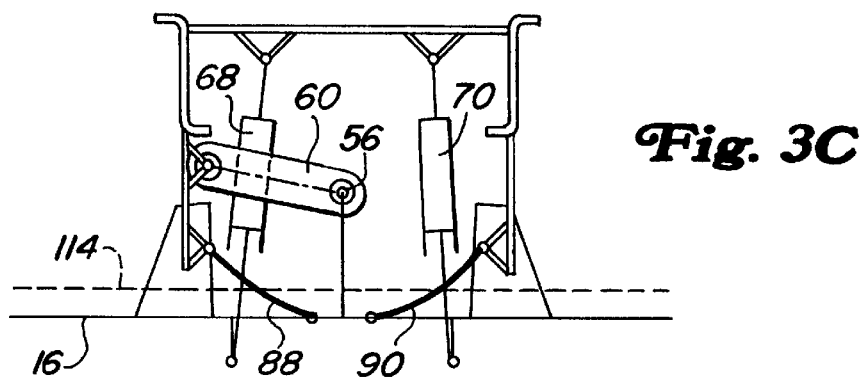

FIGS. 3a through 3d show four differing positions of the axle body 16 with respect to the vehicle chassis or frame 12. FIG. 3a shows a central (neutral), non-pivoted position 114 of the axle body 16. The two hydraulic cylinders 68, 70 are retracted halfway. The transverse steering arm 60 occupies a generally horizontal position and the two chains 88, 90 are slack and do not carry any tension. In FIG. 3b the axle body 16 has experienced the full spring deflection, so that both projections 106, 108 make contact with the stop surfaces 110, 112 on the frame 12. The transverse steering arm is inclined slightly downward from the pivot axis 56. Here too, the chains 88, 90 are slack. FIG. 3c shows a position of the axle body 16 with no spring deflection, in which the hydraulic cylinders are fully extended. The transverse steering arm 60 is inclined slightly upward from the pivot axis 56. In this position too, the two chains 88, 90 are still somewhat slack.

Figure 3D:
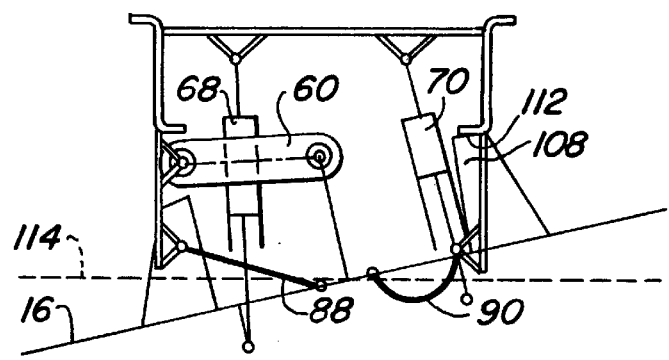

In FIG. 3d the axle body is pivoted fully to the maximum allowable pivoting angle of, for example, 11 degrees. The hydraulic cylinders 68, 70 are retracted to differing degrees. The transverse steering arm 60 occupies approximately its central, horizontal position. The chain 88 has been straightened under tension and stop projection 108 engages stop surface 112 on the frame 12, so that chain 88, projection 108 and stop surface 112 operate to limit the pivoting angle. The other chain 90 is slack. No further spring deflection is possible.

This suspension makes it possible to freely select the location of the spring arrangement and to optimize with respect to favorable visibility and the available space. The original steering angle deflection of a steerable axle is not reduced, adequate free space between the wheel or the fender and the chassis can be maintained and space for the mounting of implements, such as front loaders, is preserved. Furthermore, the forces developed in the individual components of the axle suspension can be controlled very well, so that wear problems and the danger of overloads are very low. This arrangement is a simple and low cost configuration. It can be provided as a retrofit kit for axles which were previously unsprung.

With the pivot bearing in the vertical center plane of the vehicle and above the rotation axis of the wheels and with the pivot stops coupled to a lower portion near the centerline of the axle body, the motion of the axle body includes a lateral or sideways component. This creates additional free space between the inner surface of the wheel and the chassis which is advantageous during cornering due to the confined space experienced at that time. The suspension is symmetrical about a central plane and operation is equal on both sides.

The maximum allowable pivoting angle can easily be controlled by selecting a chain of appropriate length. Chains can be manufactured at low cost and have a high load capacity. They require relatively little space and can easily conform to the actual space requirements.

Preferably, the chains 88, 90 contain three generally ring-shaped links, both of whose outer end links are hooked onto pins which form the joints. The links of the chains may have differing lengths. Each end link is preferably configured in a tear-drop shape so that the opening enclosed by the ring widens to one side. The side with the wider opening engages the particular pin, while the opposite side with the narrower opening engages the center link of the chain. This chain configuration makes possible the use of relatively slender chain links in combination with comparatively heavy locating pins that are appropriate for greater forces. It requires relatively little space but is nevertheless adequate to absorb heavy loads.

For good visibility, it is advantageous to locate the spring arrangement generally within the region of the vehicle body, for example, within a vehicle frame or within the engine enclosure. Such a spring arrangement may provide a spring deflection that basically permits a pivoting angle that is greater than the desired maximum pivoting angle. The pivoting angle is then limited by the pivot stop.

While the present invention has been described in conjunction with a specific embodiment, it is understood that many alternatives, modifications and variations will be apparent to those skilled in the art in light of the foregoing description. For example, the pivot stop could comprise a rope, a telescoping device or a buckling system could be arranged between each joint fixed to the axle and each joint fixed to the chassis. A rope would act in a manner similar to the chain described above. In addition to limiting motion, a telescoping device could provide a damping function. A buckling system could contain a double link that consists of two buckling rods whose joints are spherical bearings and that are connected to each other by a buckling bearing. The buckling would permit the relative motion between the joints. In order to permit buckling only in one direction and that an extended dead center position is avoided, a corresponding stop between the two buckling rods could be provided. Accordingly, this invention is intended to embrace all such alternatives, modifications and variations which fall within the spirit and scope of the appended claims.

We claim:

1. A suspension for suspending a rigid axle body from a frame of a vehicle, the suspension having a pivot bearing for pivotally supporting the axle body, a spring arrangement for resiliently coupling the axle body to the frame, a thrust arm extending in a longitudinal direction between the axle body and the frame, and a steering arm extending generally horizontally and transverse to the longitudinal axis of the vehicle, the steering arm having one end connected to the frame and a second end connected by the pivot bearing to the axle body, characterized by:

a pivot stop coupled to the axle body at a first joint spaced apart from the pivot bearing and coupled to the frame at a second joint, a line connecting the first and second joints extending generally at a small angle with respect to an axis of the axle body, and the pivot stop permitting movement of the joints towards each other, and limiting movement of the joints away from each other and thereby limiting pivoting of the axle body to a maximum angle.

2. The suspension of claim 1, wherein:

said line extends generally transverse to a longitudinal direction of the vehicle and transverse to an axis of a spring element of the spring arrangement.

3. The suspension of claim 1, wherein:

the pivot bearing has a pivot axis which is located in a center plane of the axle body and which is located above and transverse to the axis of the axle body.

4. The suspension of claim 1, wherein:

a pair of pivot stops are coupled to the axle body and to the frame; and a pair of second joints are fixed to the frame and are arranged on both sides of the pivot bearing, each of said second joints being coupled to one of the pivot stops.

5. The suspension of claim 1, further comprising:

a stop means which limits relative motion between the axle body and the frame in a vertical direction.

6. The suspension of claim 5, wherein the stop means comprises:

a stop projection extending upward from the axle body; and a stop surface on the frame located above the stop projection and which is engageable with the stop projection.

7. The suspension of claim 1, wherein:

the pivot stop comprises a chain having a plurality of links.

8. The suspension of claim 7, wherein:

the chain has an end link with larger and smaller ends, said chain being coupled to one of said joints by a pin which extends through the larger end.

9. The suspension of claim 1, wherein:

the suspension comprises a pair of pivot stops, each pivot stop comprising a chain, each chain having one end coupled to a central region of the axle body, each chain having a second end coupled to the frame, and each chain having a plurality of links extending generally transverse to a longitudinal axis of the vehicle in opposite directions, said chains being slack in a neutral position of the axle body, and one of the chains being straightened when the axle body is in a maximum pivot position.

10. The suspension of claim 1, wherein:

the pivot stop comprises a rigid bracket pivotally coupled to one of the joints, and pivotally and slidably coupled to the other joint.

11. The suspension of claim 1, wherein:

the spring arrangement has a range of motion which, but for the pivot stop, would permit the axle body to pivot beyond said maximum angle.

12. The suspension of claim 1, wherein:

the spring arrangement comprises a pair of generally vertically extending hydraulic cylinders which are arranged on opposite sides of the pivot bearing, each cylinder having a first end coupled to the axle body and a second end coupled to the frame.

13. The suspension of claim 1, wherein:

the axle body is part of a driven, steerable front axle.

14. The suspension of claim 1, wherein:

the thrust arm has a generally U-shaped cross section which opens upwardly, the thrust arm having a rear end coupled to the frame and having a front end rigidly connected to the axle body, the thrust arm receiving a vehicle articulated drive shaft.

* * * * *